United States Patent [19]
Coupin et al.

[11] 3,794,895
[45] Feb. 26, 1974

[54] ELECTRIC MOTORS WITH ELECTRONIC COMMUTATION

[75] Inventors: Claude Coupin, Argenteuil; Alain Deval, Fontenay-le-Fleury, both of France

[73] Assignee: Societe D'Applications Generales D'Electricite Et De Mecanique SAGEM, Paris, France

[22] Filed: Oct. 28, 1971

[21] Appl. No.: 193,293

[30] Foreign Application Priority Data
Nov. 5, 1970 France .............................. 7039856

[52] U.S. Cl. .................. 318/254, 318/138, 318/439
[51] Int. Cl. ......................................... H02k 29/00
[58] Field of Search ..................... 318/254, 138, 439

[56] References Cited
UNITED STATES PATENTS

| | | | |
|---|---|---|---|
| 3,377,535 | 4/1968 | Yasuoka et al. | 318/138 |
| 3,305,713 | 2/1967 | Ikegami | 318/138 |
| 3,461,367 | 8/1969 | Takeyasu et al. | 318/138 |
| 3,465,224 | 9/1969 | Takeyasu | 318/138 |
| 3,242,406 | 3/1966 | Tunaka | 318/138 |

*Primary Examiner*—G. R. Simmons
*Attorney, Agent, or Firm*—Larson, Taylor & Hinds

[57] ABSTRACT

The motors are supplied by DC current and comprise two coils wound at 90° on a stator, the motor coil being supplied by a power amplifier, whilst the detector coil delivers a detector signal introduced into a dephaser. The motors are particularly useful for driving inertia wheel equipment, especially gyroscopes.

9 Claims, 10 Drawing Figures

2

ELECTRIC MOTORS WITH ELECTRONIC COMMUTATION

The invention relates to electric motors with electronic commutation, that is to say to motors supplied by a DC current, of which the commutation is ensured by electronic means (transistors, thyristors) instead of being ensured by mechanical means (brushes and a collector).

It should be understood that by the expression electric motor with electronic commutation, is meant, in the following, the assembly constituted by the electric motor proper and the devices ensuring the electronic commutation.

In such motors, problems of regulation or of servo coupling of the speed of rotation and problems of starting occur.

It is an object of the invention to provide an electric motor with electronic commutation of which the speed can be regulated or servo-coupled by simple electronic means.

It is another object of the invention to provide an electric motor with electronic commutation of which the starting is ensured by a time delay device enabling the motor to start without external mechanical assistance.

It is a further object of the invention to provide an electric motor with electronic commutation having a high efficiency due to a particular arrangement of its coils.

The invention applies more particularly, but not exclusively, among these electric motors with electronic commutation, to those intended to drive, at high speed, inertia wheels, such as fly wheels of gyroscopes.

The electric motor with electronic commutation according to the invention is characterised by the fact:

that it comprises n pairs of coils wound on its stator, so that the coils of a same pair are displaced with respect to one another by 90° electrically, that for each pair of coils, one of the coils (motor coil) is supplied by a power amplifier with at least one adjustable threshold ( positive or negative), this amplifier ensuring the electronic commutation of a supply voltage (positive or negative), whilst the other coil (detector coil) delivers a detector signal which is a function of the rotary speed of the motor, this detector signal being introduced into a dephaser of 90° of which the output signal controls the power amplifier, and that the adjustable threshold of the power amplifier is fixed by a voltage generator delivering a regulating voltage (positive or negative).

The invention consists, apart from this main feature, of certain other features which are preferably used at the same time and which will be more explicitly discussed below.

In order that the invention may be more fully understood, two preferred embodiments of the invention are described below purely by way of illustrative but non-limiting example, with reference to the accompanying drawings in which.

Figure 1:
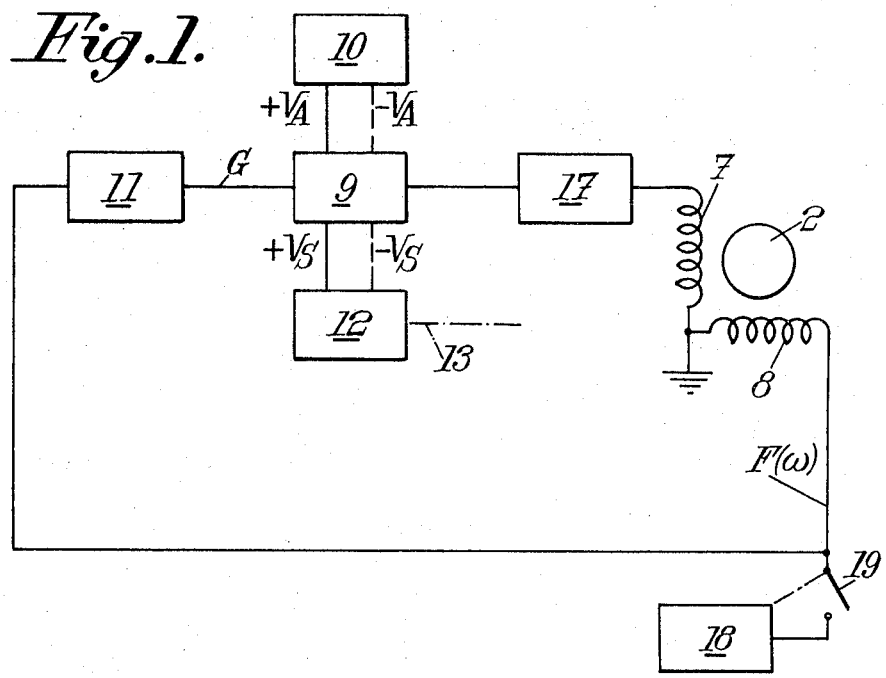
FIG. 1 is an electrical diagram of one embodiment of a motor constructed according to the invention.

As shown in FIGS. 1, 3, 6, and 7, the electric motor according to the invention comprises a stator 1 that is assumed, by way of example, to be arranged inside a rotor 2.

This rotor 2 is essentially constituted by a permanent magnet 3 surrounding the stator 1, and by a body 4 mounted on a fixed shaft 5, borne by the stator 1, by means of bearings 6.

Figure 3:
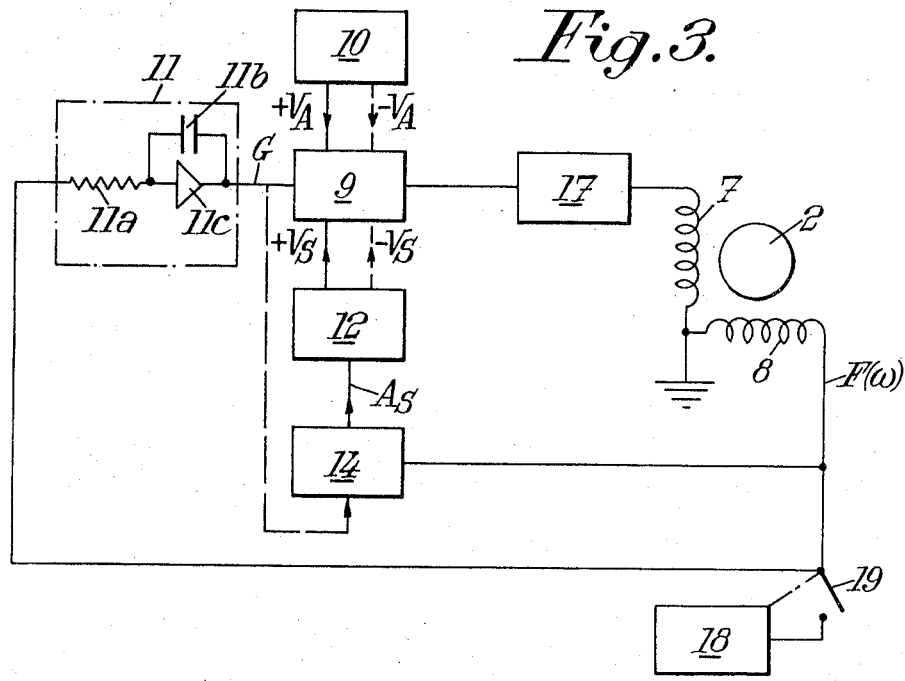
FIG. 3 is an electrical diagram of a second embodiment of a motor constructed according to the invention.

On the stator 1, advantageously constituted of ferrite, are wound two coils 7 and 8 displaced with respect to one another by 90° electrically, in the case envisaged of a motor with a single pair of coils, the coils 7 and 8 are then also displaced by 90° mechanically, as shown diagrammatically in FIGS. 1, and 3.

This being the case, one of these two coils, the motor coil 7, is supplied by a power amplifier (voltage comparator) 9 with at least one adjustable threshold (positive or negative), this amplifier 9 ensuring the electronic commutation of a supply voltage $V_A$ (positive or negative from a supply device 10. Amplifier 9 can take the form of the circuit shown at FIG. 17–4 of page 327 of text *Principles et Applications Des Circuits Integres Lineaires* by Editions Radio, Paris, 1968.

The other winding, the detector winding 8, delivers a detector signal $F(\omega)$ which is a function of the rotary speed of the motor, this signal $F(\omega)$ being introduced into a dephasor 11 ensuring a phase displacement by 90° and of which the output signal G controls power amplifier 9.

The adjustable threshold of the power amplifier 9 is fixed by a voltage generator 12 delivering a regulating voltage $V_S$ (positive or negative).

In FIGS. 1, and 3, there is shown in continuous line the electrical connections responding to the case where the power amplifier 9 is at a positive threshold, the supply voltage $V_A$ then being the positive voltage $+V_A$, and the regulating voltage then being the positive voltage $+V_S$.

In interrupted line there is shown, on these same Figures, the electrical connections corresponding to the case where the power amplifier 9 is at a negative threshold, the supply voltage $V_A$ then being the negative voltage $-V_A$, and the regulating voltage then being the negative voltage $-V_S$.

Figure 2A:
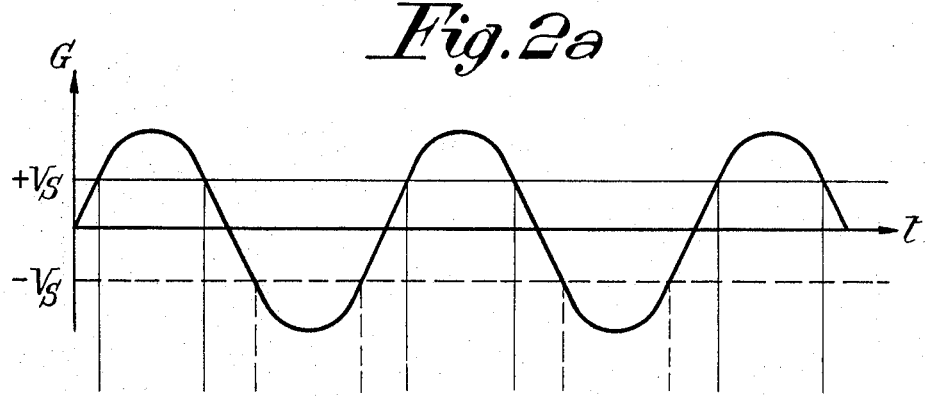
FIGS. 2a and 2b are graphs illustrating the operation of the embodiment of the motor shown in FIG. 1.
Figure 2B:
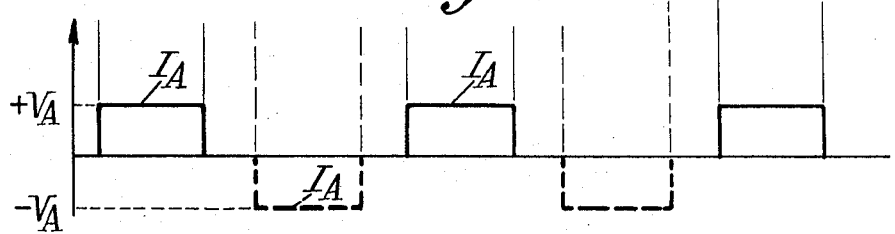

FIGS. 2a and 2b show the graphs illustrating the operation of the motor in the case of a positive voltage supply $+V_A$ and negative $-V_A$, the power amplifier 9 then being at positive and negative thresholds fixed by the positive $+V_S$ and negative $-V_S$ regulating voltages.

In the graph of FIG. 2a, there is traced a curve with the time $t$ as abscissae and the output signal of the dephaser 11 as ordinates. This curve is completed by two straight lines parallel to the axis of abscissae and corresponding, the upper solid line to the regulating voltage $+V_S$ fixing the positive threshold, and the lower discontinuous line to the regulating voltage $-V_S$ fixing the negative threshold.

In the graph of FIG. 2b there is traced the supply pulses $I_A$ supplying in operation the motor coil 7, with time $t$ as abscissae and the supply voltage of the supply device 10 as ordinates. The pulses in solid line correspond to the positive supply voltage + $V_A$, and the pulses in discontinuous line correspond to the supply voltage − $V_A$.

It is then seen that any variation in the regulating voltage + $V_S$ is manifested by a variation in the width of the positive and negative pulses, hence by variation in the rotary speed of the motor.

The voltage generator 12 can hence be adjusted or servo-coupled by different means, which will be described below, to adjust or servo-couple the rotary speed of the motor.

In FIG. 1, there is shown a simple mechanical control 13 terminating at the voltage generator 12.

In FIG. 3, there is shown a servo-coupling of the voltage generator 12 controlled by the output signal G of the dephaser 11, this servo-coupling implying that this output signal is independent of the rotary speed ω of the motor.

To this end, the dephaser 11 is constituted by an integrater — dephaser comprising an RC circuit 11a, 11b, and an amplifier 11c; such a dephaser has a gain of 1/ω which transforms the detector signal F (ω) as a function of ω into an output signal G independent of ω.

This signal G is introduced into a regulating device or summing circuits 14 which also receives the detector signal F (ω) and which delivers a servo-coupling signal $A_S$ introduced into the voltage generator 12.

In any case, and as shown in FIGS. 1, and 3, it is advantageous to provide, for the period of starting of the motor, a current limiter 17 interposed between the power amplifier 9 and the motor coil 7.

Figure 5:
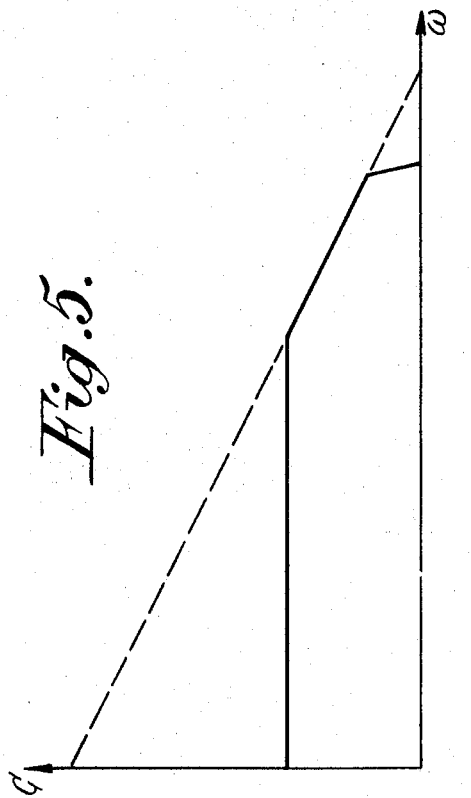
FIG. 5 is a graph illustrating the advantages obtained through a motor according to the invention.

The advantage obtained by this current limiter 17 illustrated in the graph of FIG. 5 which shows by the curve in solid line the development of the motor torque C (as ordinates) as a function of the rotary speed of the motor ω (as abscissae).

The first portion (horizontal) of this curve corresponds to the limiting of the torque caused by the current limiter 17, the second portion of this curve corresponding to the normal development of the torque (which development is represented by the discontinuous line), and the third portion (substantially vertical) corresponds to the regulating or servo-coupling action, or to the synchronization on the power amplifier 9.

As regards the starting of such a motor, it is advantageously ensured by a time delay device 18 (FIGS. 1, and 3) arranged so as to deliver successively:

a positioning pulse $I_P$ into the detector coil 8, this pulse being such that it causes the displacement of the rotor 2 to a position at 90° electrically (and mechanically in the case of a single pair of coils), with respect to the motor coil 7, and a starting pulse $I_L$ into the motor coil 7, this pulse being such that it causes the starting of the rotor 2.

A commutator 19, controlled by this time delay device 18, ensures the disconnecting of the time delay device 18 as soon as the starting of the rotor 2 is effected, that is to say after the emission of the starting pulse $I_L$.

Figure 4:
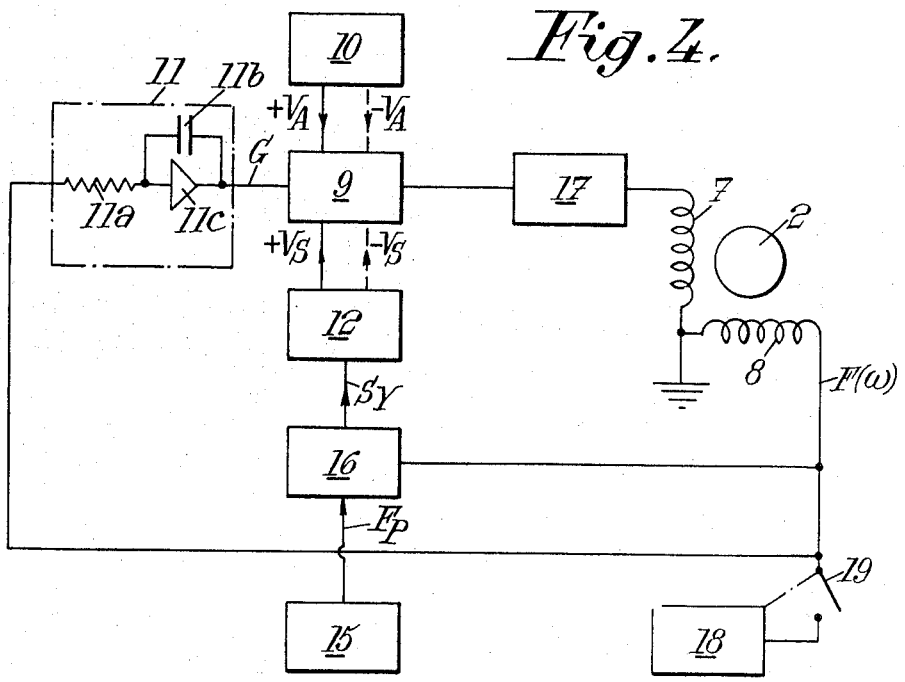
FIGS. 4a, 4b and 4c are graphs illustrating the procedures of starting a motor according to the invention.
Figure 4A:
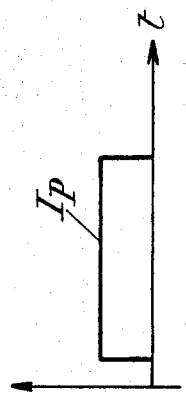
Figure 4B:
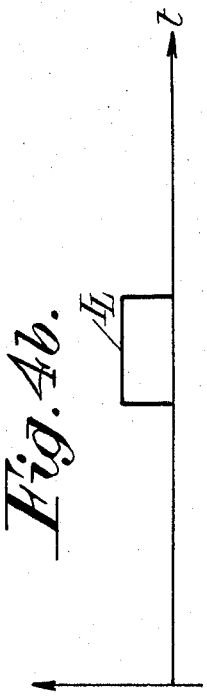
Figure 4C:
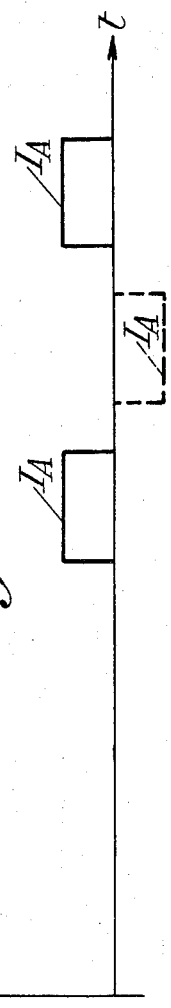
Figure 7:
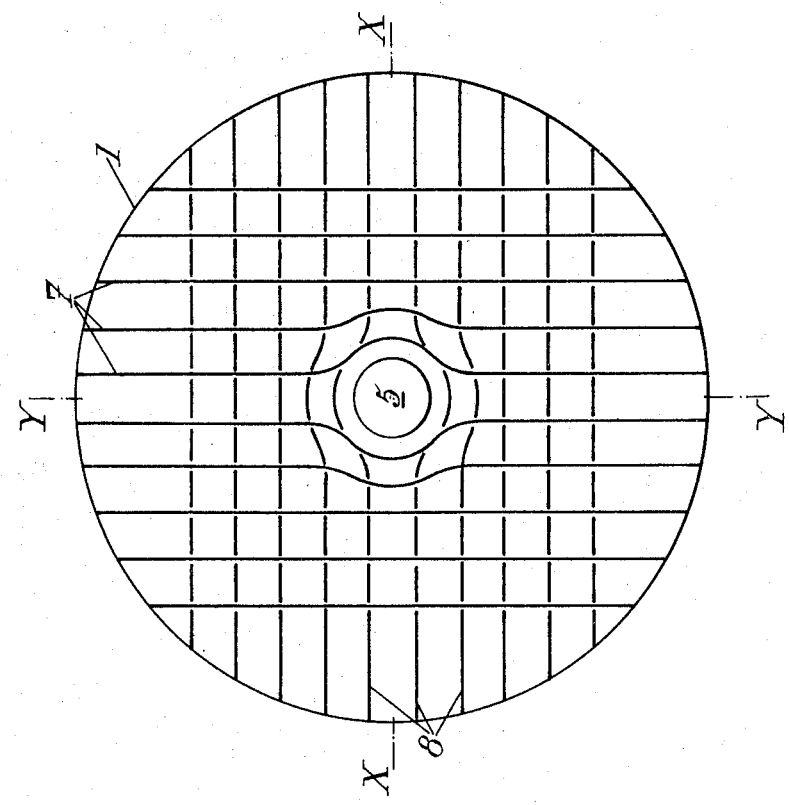
FIG. 7 is an end view of the stator of the motor.
Figure 6:
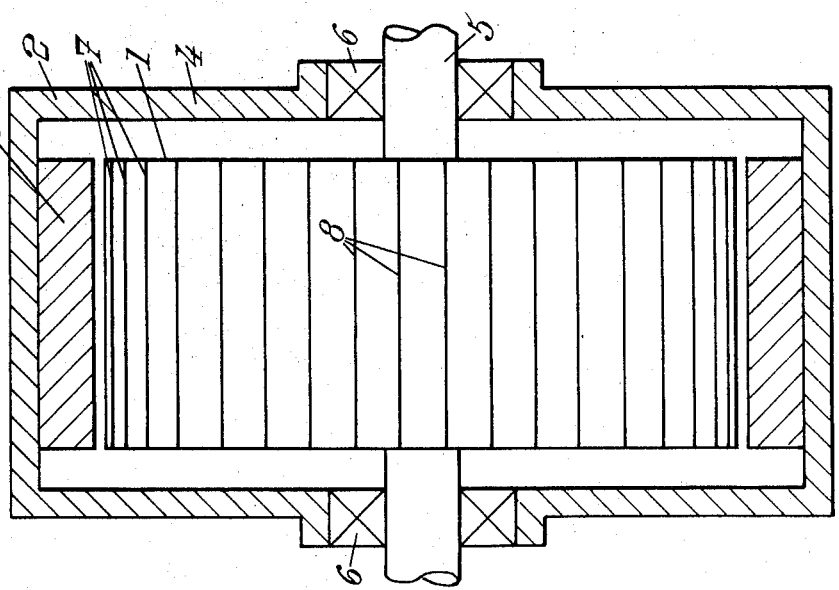
FIG. 6 is an axial section of a motor according to the invention.

In the graphs of FIGS. 4a, 4b and 4c there is shown the positioning pulse $I_P$ (FIG. 4a), the starting pulse $I_L$ (FIG. 4b) and the supply pulses $I_A$ (FIG. 4c), the time being shown as abscissae and the amplitude of these pulses as ordinates.

As regards the stator 1, it can be constituted by a ferrite cylinder on which the motor 7 and detector 8 coils are wound so as to form annular winding 7 and 8 of which the respective axes XX AND YY are at 90°.

Finally there is obtained a motor with electronic commutation of which the advantages can be summarized by the following points:

great possibilities in the field of speed regulation, simplicity of the starting device which ensures the starting of the rotor in a predetermined direction, high efficiency due to winding of the coils on a ferrite stator, insensitivity of the rotary speed to possible variations in the induction of the permanent magnets of the rotor, which variations could be due to the environment of the motor, in particular to temperature conditions, possibility of eliminating magnetic losses towards the exterior due to the conception of the stator — rotor assembly.

As is self-evident and as emerges already from the foregoing, the invention is in no way limited to those of its methods of application, nor to those of its methods of production of its various parts, which have been more especially indicated; it encompasses, on the contrary, all variations.

We claim:

1. An electric motor with electronic commutation, comprising:

a rotor, a stator comprising $n$ pairs of coils, each said pair comprising a driving coil, and a detector coil for providing a signal whose frequency and amplitude are proportional to the speed of said rotor, $n$ being a whole number, the detection coil and driving coil of a said pair of coils being electrically offset by 90°, a voltage generator for providing a variable DC threshold voltage, dephasing means, having an input connected to said detector coils, for providing an output signal which is 90° out of phase with respect to the input signal from said detector coil irrespective of the frequency thereof, and amplifier means, having separate control inputs connected to said voltage generator and said dephasing means, for applying a voltage to said power windings when said dephased voltage exceeds said DC threshold.

2. An electric motor with electronic commutation, comprising:

a rotor, a stator comprising $n$ pairs of coils, each said pair comprising a driving coil, and a detector coil for providing a signal whose frequency and amplitude are proportional to the speed of said rotor, $n$ being a whole number, the detection coil and driving coil of the same pair of coils being electrically offset by 90°, a resistor-capacitor integrating network, having an input connected to said detector coils, for delivering a signal which is 90° out of phase with the input signal and whose amplitude is independent of the speed of said motor, a voltage generator for providing a threshold voltage in direct relation to the difference between the amplitude of the output signal of said integrating network and the amplitude of a reference signal, and amplifier means, having control inputs respectively connected to the output of said voltage generator and to the output of said integrating network, for applying a voltage to said power windings when said output voltage from the integrating network exceeds said threshold.

3. Electric motor with electronic commutation according to claim 1, including a mechanical control for adjusting the voltage generator.

4. Electric motor with electronic commutation according to claim 2, having a regulating device into which the output signal of the dephaser is introduced, said regulating device being arranged to receive also said detector signal and to deliver a control signal which is applied to the voltage generator.

5. Electric motor with electronic commutation according to claim 2, including a current limiter interposed between the amplifier and the motor coil.

6. Electric motor with electronic commutation according to claim 1, further comprising a time delay device for delivering, successively, on starting of the motor, a positioning pulse to the detector coil to cause the displacement of the rotor to a position at 90° electrically with respect to the motor coil, and a starting pulse to the motor coil to cause starting of the rotor.

7. Electric motor wwth electronic commutation according to claim 6, further including a commutator, controlled by the time delay device, for dis connecting said time delay device upon starting of the rotor.

8. Electric motor with electronic commutation according to claim 1, wherein the stator comprises a ferrite cylinder on which $n$ pairs of coils are wound so that the two coils of a same pair form annular coils of which the respective axes are displaced by an angle of $\pi/2n$.

9. Electric motor with electronic commutation according to claim 2, comprising a single pair of coils.

* * * * *

UNITED STATES PATENT OFFICE
CERTIFICATE OF CORRECTION

Patent No. 3,794,895         Dated February 26, 1974

Inventor(s)   Claude Coupin and Alain Deval

It is certified that error appears in the above-identified patent and that said Letters Patent are hereby corrected as shown below:

Delete Figure 4.

Signed and sealed this 19th day of November 1974.

(SEAL)
Attest:

McCOY M. GIBSON JR.
Attesting Officer

C. MARSHALL DANN
Commissioner of Patents